(12) United States Patent
Unrath

(10) Patent No.: US 8,680,430 B2
(45) Date of Patent: Mar. 25, 2014

(54) CONTROLLING DYNAMIC AND THERMAL LOADS ON LASER BEAM POSITIONING SYSTEM TO ACHIEVE HIGH-THROUGHPUT LASER PROCESSING OF WORKPIECE FEATURES

(75) Inventor: Mark A. Unrath, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1126 days.

(21) Appl. No.: 12/330,418

(22) Filed: Dec. 8, 2008

(65) Prior Publication Data

US 2010/0140237 A1      Jun. 10, 2010

(51) Int. Cl.
*B23K 26/00*      (2006.01)
*B23K 26/08*      (2006.01)

(52) U.S. Cl.
CPC ......... *B23K 26/0807* (2013.01); *B23K 26/0823* (2013.01); *B23K 26/0853* (2013.01)
USPC ............. 219/121.72; 219/121.78; 219/121.79

(58) Field of Classification Search
USPC ............. 219/121.7, 121.73, 121.74; 359/385, 359/368, 373, 351, 383; 438/8, 690; 216/94, 85; 156/345.24, 345.1
See application file for complete search history.

(56) References Cited

U.S. PATENT DOCUMENTS

| | | | |
|---|---|---|---|
| 4,532,402 A | | 7/1985 | Overbeck |
| 4,626,613 A | * | 12/1986 | Wenham et al. ............... 136/255 |
| 5,635,976 A | * | 6/1997 | Thuren et al. .................. 347/253 |
| 5,751,585 A | | 5/1998 | Cutler et al. |
| 5,798,927 A | | 8/1998 | Cutler |
| 5,837,962 A | | 11/1998 | Overbeck |
| 6,496,292 B2 | * | 12/2002 | Fillion et al. ................ 359/201.1 |
| 6,639,179 B2 | * | 10/2003 | Vogler et al. .............. 219/121.71 |
| 6,706,999 B1 | | 3/2004 | Barrett et al. |
| 2003/0042230 A1 | * | 3/2003 | Gross et al. ................. 219/121.7 |
| 2003/0156323 A1 | * | 8/2003 | Overbeck ...................... 359/385 |
| 2004/0129685 A1 | * | 7/2004 | Arai et al. ................... 219/121.7 |
| 2005/0279807 A1 | * | 12/2005 | Johnson ......................... 228/101 |
| 2006/0169677 A1 | * | 8/2006 | Deshi .......................... 219/121.7 |
| 2006/0211158 A1 | * | 9/2006 | Arai et al. .......................... 438/8 |
| 2008/0017618 A1 | | 1/2008 | Bruland et al. |

FOREIGN PATENT DOCUMENTS

| | | |
|---|---|---|
| JP | 01-1113191 | 5/1989 |
| JP | 02-942804 | 6/1999 |

OTHER PUBLICATIONS

International Search Report and Written Opinion, International Patent Application No. PCT/US2009/066063, dated Jul. 8, 2010, 8 pages.

* cited by examiner

*Primary Examiner* — Tu B Hoang
*Assistant Examiner* — Thien S Tran
(74) *Attorney, Agent, or Firm* — Stoel Rives LLP

(57) ABSTRACT

A method of accomplishing high-throughput laser processing of workpiece features arranged in a densely spaced pattern minimizes workpiece feature processing inaccuracy and quality degradation that result from dynamic and thermal loads on laser beam positioning and optical components directing the laser beam during workpiece feature processing. A preferred embodiment is implemented with a laser beam positioning system composed of a zero-inertia optical deflector of an acousto-optic beam deflector (AOD) or an electro-optical deflector (EOD) type, a galvanometer head, and a linear stage cooperating to position the laser beam among the workpiece features.

17 Claims, 4 Drawing Sheets

CONTROLLING DYNAMIC AND THERMAL LOADS ON LASER BEAM POSITIONING SYSTEM TO ACHIEVE HIGH-THROUGHPUT LASER PROCESSING OF WORKPIECE FEATURES

COPYRIGHT NOTICE

© 2008 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This disclosure relates to laser processing workpiece features and, in particular, to performing high throughput laser processing of densely spaced workpiece features while minimizing degradation of accuracy and workpiece feature quality that result from dynamic and thermal loads on laser beam positioning and optical system components.

BACKGROUND INFORMATION

Certain laser processing applications require extremely high throughput processing of a regularly spaced pattern of target locations on a workpiece. For instance, certain solar cell processing applications require the drilling of vias through the silicon wafer in a regularly spaced grid pattern. Customers for these applications require very high processing throughput, on the order of several thousand vias per second.

The spacing of vias in these applications is fairly dense, on the order of 0.5 mm-1 mm. The overall processed area is significant, typically 150 mm×150 mm square wafers. The laser processing system must, therefore, cover this entire area while very rapidly drilling the tight-pitch vias. The accuracy required in such systems is on the order of 10 µm-20 µm. The drill time for each via depends greatly on laser characteristics (wavelength, pulse frequency, pulse power, and pulse width), via diameter, and substrate material and thickness. The drill time is, however, typically on the order of 0.1 msec-0.5 msec. Via diameters are typically on the order of 20 µm-50 µm.

Typical conventional approaches rely on galvanometer (galvo)-based positioning of the laser processing beam, either alone (with a very large galvo field) or combined with a movable stage (with a relatively small galvo field). Each of these approaches has certain limitations.

A first system architecture implementing galvo-based processing laser beam positioning uses a single large galvo field to cover the entire workpiece. This implementation requires either a very large scan lens or a post-lens scanning system. In either case, the galvo typically moves the processing beam at a constant velocity over the entire workpiece, and a controller fires a laser pulse at each via location without stopping the galvo. Several passes are required to fully drill each via. This is possible because of the relatively small number of pulses required for each via and the regularly spaced pattern of target via locations. This approach avoids the timing overhead and thermal effects of frequent galvo acceleration and deceleration, because galvo turnarounds take place only at the edges of the workpiece.

If a very large scan lens is used to cover the entire workpiece field, the large lens is subject to accuracy degradation caused by optics heating that results from working with high-powered laser beams. It also requires a large beam diameter to obtain the required workpiece surface spot size. Such large beam diameters require large galvos, which in turn suffer from accuracy effects resulting from the lower thermal efficiency of moving large (high-inertia) mirrors with large (high-inertia) galvos.

If a post-lens scanning system is used to cover the entire workpiece field, the lens thermal accuracy effects are reduced. The processing system suffers, however, from the effects of non-telecentric beam delivery, which degrades the quality of the drilled vias. Moreover, minimizing such telecentric errors requires that the focal length be kept large, again requiring a large beam diameter to obtain the required workpiece surface spot size. This leads to thermal accuracy issues similar to those described above because of the large galvos required in such systems. If telecentric errors are not of significance, one can use a shorter FL lens and avoid the nonflat focus field problem by using a dynamic focus element. The disadvantages of this approach are cost, complexity, inaccuracy contribution by the focus element; cost of the focus element for very high-speed applications; and residual telecentric error.

A second system architecture is a compound positioning system, in which a small galvo field (typically about 20 mm square) is implemented in conjunction with a structural mechanism that moves a galvo head over the workpiece (either through an X-Y workpiece table, or by a cross-axis moveable optics configuration). As in the first system architecture, the galvo may scan over the vias at a constant velocity, pulsing the processing laser beam at each via, to avoid the overhead of stopping at each via location. As the galvo rapidly scans over its field, the galvo must spend a significant amount of time accelerating and decelerating at the edges of the scan field because it is significantly smaller than the workpiece. This expenditure of time causes a significant reduction in throughput, and if high acceleration is used to reduce the turnaround time, thermal heating of the galvo degrades accuracy and places an upper limit on achievable acceleration. However, the second system architecture does have the advantage of higher accuracy (resulting from reduced lens distortion with the smaller scan lens), improved via quality (resulting from the smaller, lower-distortion scan lens, and the telecentric scan field), and potentially high beam positioning speed (resulting from small galvos and mirrors). Yet this approach may be infeasible because of the throughput limitation described above, depending on the number of laser pulses required to process each via.

What is needed is a laser processing system that can rapidly position the processing laser beam among target locations arranged in a regularly spaced pattern, with acceptable beam quality and precision, at a speed that meets high throughput requirements.

SUMMARY OF THE DISCLOSURE

A method of accomplishing high-throughput laser processing of densely spaced workpiece features minimizes workpiece feature processing inaccuracy and quality degradation that result from dynamic and thermal loads on laser beam positioning and optical components directing the laser beam during workpiece feature processing. A preferred embodiment entails positioning on a support a workpiece having a process surface that defines a process surface area and directing a laser beam to a beam positioning system to provide a processing laser beam for incidence at feature locations aligned along a processing band on the process surface. The beam positioning system includes a movable stage and first and second beam positioners that cooperate with the movable stage to process workpiece features at the feature locations on the process surface. The first beam positioner is characterized by a first response time and is operable to position the processing laser beam within a scan field region of the process surface. The second beam positioner includes a zero-inertia optical deflector of an acousto-optic type characterized by a second response time and operable to move the processing beam to locations within the scan field region. The second response time is shorter than the first response time and preferably shorter than the inter-pulse period of the processing laser.

The preferred method also entails controlling the beam positioning system to perform several functions. The first function is to coordinate operation of the movable stage and the first beam positioner to position the processing laser beam within the scan field region and move the scan field region to cover the process surface. The scan field region is substantially smaller than the process surface area of the workpiece and includes multiple processing bands that each encompass multiple feature locations. The second function is to operate the first beam positioner to successively position the processing laser beam to the multiple processing bands within the scan field region. The third function is to operate the second beam positioner to process the workpiece features at the multiple feature locations in each of the processing bands. This is accomplished by moving the processing laser beam to and dwelling the processing laser beam at each feature location to process the workpiece features in the processing band. A beneficial result is that the first beam positioner undergoes negligible acceleration and deceleration during workpiece feature processing within the scan field region. Another beneficial result is that the processing laser beam is moved to new feature locations within its inter-pulse period, thereby eliminating move time (during processing along the processing band) and increasing throughput.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
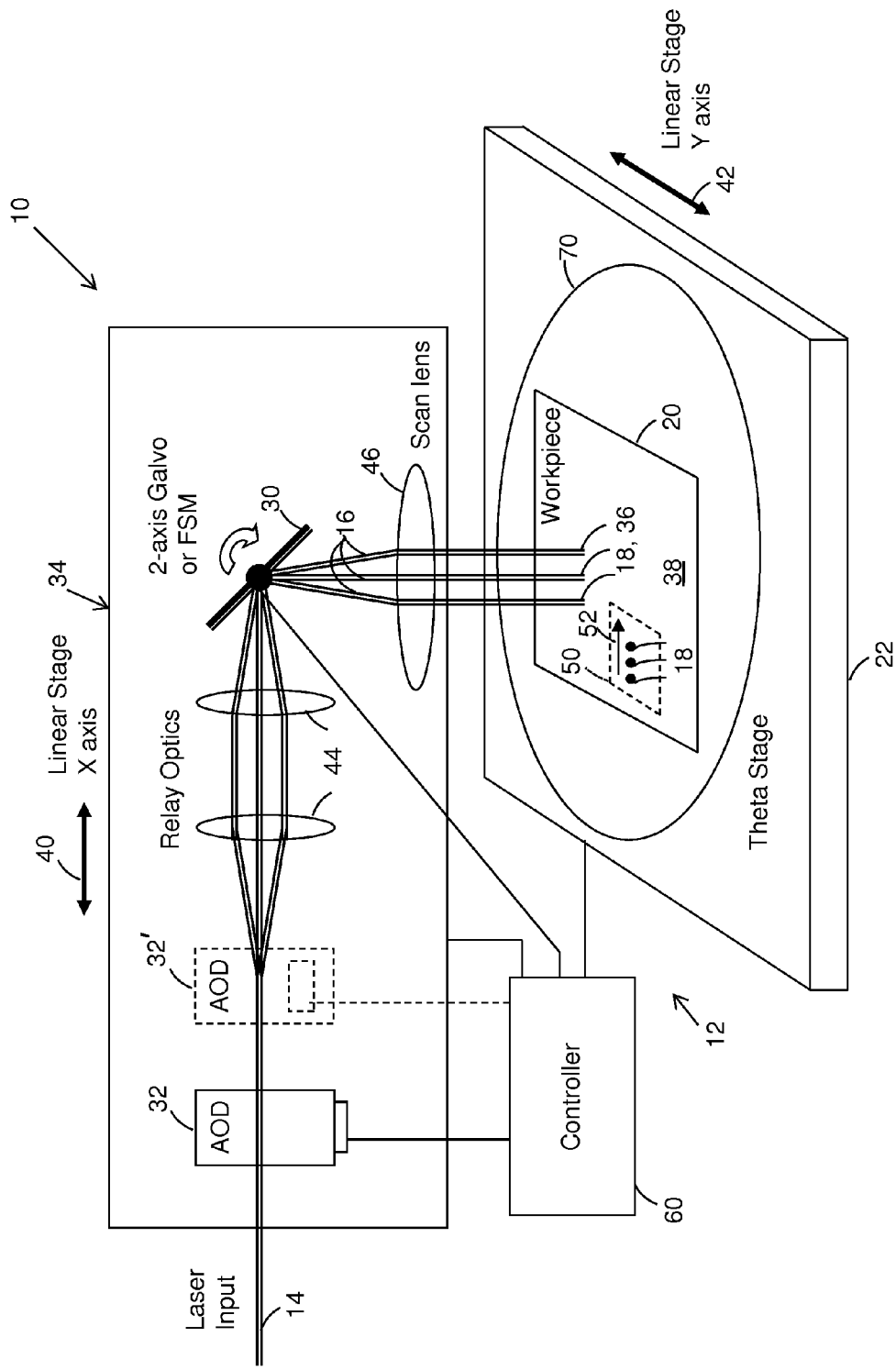
FIG. 1 is a diagram of the hardware architecture of a preferred embodiment of the disclosed laser beam positioning system.

FIG. 1 shows the hardware architecture of a preferred embodiment of a laser beam positioning system 10 of a laser-based specimen processing system 12. Beam positioning system 10 receives an input laser beam 14 and directs it to form a processing laser beam 16 that processes target features 18 of a workpiece 20 mounted on a support 22. Beam positioning system 10 includes as a first beam positioner a mirror-based beam positioner 30 and as a second beam positioner a zero-inertia optical deflector 32 that cooperate with a movable stage 34 to direct processing beam 16 to process target features 18 at target feature locations 36 on a process surface 38 of workpiece 20. A preferred zero-inertia optical deflector 32 is an acousto-optic deflector (AOD) such as, for example, a Neos 45100-5-6.5 DEG-0.51 one-dimensional deflector, which is available from Neos Technologies, Inc., Melbourne, Fla. Mirror-based beam positioner 30 may be a two-axis fast steering mirror (FSM) or a two-axis galvanometer beam positioner head, the latter of which is used in the embodiments described. A preferred FSM is a PI S330 piezo tip/tilt platform, which is available from Physik Instrumente GmbH & Co. KG, Karlsruhe/Palmbach, Germany. A preferred galvanometer is a 6230 H galvanometer, which is available from Cambridge Technology, Inc., Lexington, Mass. The preferred devices identified are suitable for use with 532 nm input laser beam 14. Movable stage 34 supports galvanometer head 30 and AOD 32 and is part of an assembly that imparts to movable stage 34 displacements in a direction 40 along an X-axis and in a direction 42 along a Y-axis.

Conventional relay lens components 44 are positioned to condition input beam 14 after it is deflected by AOD 32 and before it is incident on galvanometer head 30. Relay lens 44 translates the "pivot point" of deflected input beam 14 propagating from AOD 32 to the scan mirror surface of galvanometer head 30. Relay lens 44 is optional, depending on the angular deflection range of AOD 32 and the beam path length. The purpose of relay lens 40 is to minimize deflection of the beam impinging on the galvanometer scan mirror. Ideally, the beam should impinge on the center of the galvanometer scan mirror because decentering can create spot distortion and scan field distortion. Typically, it is desirable to maintain the impinging beam to within 0.1 mm-1.0 mm of the center of the galvanometer scan mirror. As an example, for a 30 µm spot, an AOD deflection of five spots (150 µm), and a 100 mm scan lens, the deflection angle out of AOD 32 would be 0.15/100=1.5 mrad (full angle). If the beam path is 2 m in length, the result would be a 3 mm deflection (±1.5 mm). In this case, the relay lens 44 would be desirable to locate the impinging beam on the mirror at all AOD deflection angles.

A scan lens 46 is positioned to condition processing beam 16 after it is deflected by galvanometer head 30 and before it is incident on process surface 38 of workpiece 20.

Galvanometer head 30 is characterized by X-Y displacement limits that define a scan field region 50 of process surface 38 covered by process beam 16. Scan field region 50 is of a size that ranges between 1 mm and 50 mm along each axial dimension. AOD 32, in response to applied RF power, deflects input beam 14 to move processing beam 16 along one axis (i.e., X-axis) to process multiple target features 18 located along a processing band 52 within scan field region 50. Movable stage 34 slews scan field region 50 over process surface 38 in its entirety to process all target features 18 of workpiece 20.

An alternative embodiment of movable stage 34 is a split axis assembly composed of two linear stage components that move in orthogonal directions. In the embodiment described, one linear stage would support galvanometer head 30 and AOD 32 and move them together in X-axis direction 40 and support 22 functioning as the other linear stage would support workpiece 20 and move it in Y-axis direction 42.

Figure 2:
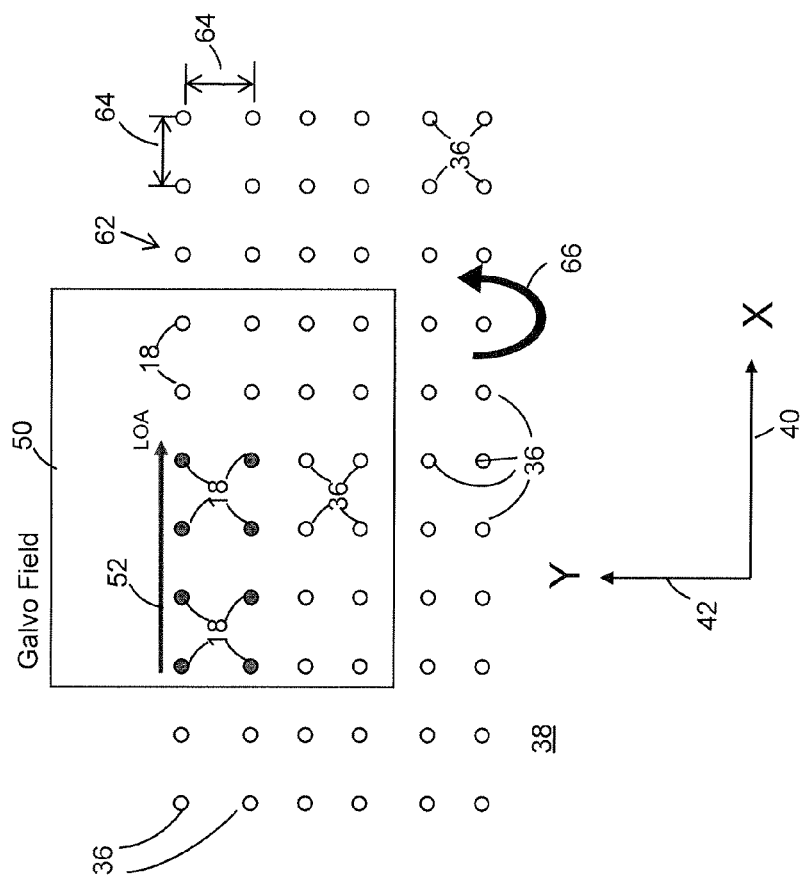
FIG. 2 is a diagram showing a plan view of an array of feature locations representing sites on a process surface of a workpiece where a processing laser is directed along a line of action by the beam positioning system of FIG. 1 to drill vias.

A controller 60 coordinates the operations of galvanometer head 30, AOD 32, and either embodiment of movable stage 34 in the manner described with particular reference to FIG. 2.

FIG. 2 is a diagram showing an array 62 of densely spaced feature locations 36 that are mutually spaced apart from one another by a distance 64 to form a regular grid pattern on process surface 38. Densely spaced feature locations 36 are those in which several (i.e., more than 3) feature locations 36 lie within a multiple of about 2-20 times the diameter of the corresponding target features 18. For the embodiment described, feature locations 36 represent sites where processing beam 16 drills a silicon wafer workpiece 20 to form vias as target features 18. A distance 64 of about 0.5 mm-1.0 mm provides a dense spacing of via locations 36 and thereby results in the drilling of tight-pitch vias 18 by processing beam 16. Scan field region 50 is shown superimposed on and partly overlapping array 62 of via locations 36. Beam positioning system 10 operates to form vias 18 across array 62 by moving processing beam 16 in accordance with the following beam positioning sequence that is coordinated by controller 60.

AOD 32 deflects input beam 14 so that processing beam 16 moves in X-axis direction 40 to process along processing band 52, in the form of a line of action (LOA) 52, a line of vias 18 at via locations 36. (FIG. 2 indicates as filled circles drilled vias 18 and as unfilled circles via locations 36 where vias 18 are to be drilled.) Processing beam 16 dwells at each via location 36 for a time that is sufficient to drill via 18 preferably by punching with a small number (e.g., 1-5) of laser pulses. Upon completion of drilling a line of vias 18 along LOA 52, galvanometer head 30 positions LOA 52 of processing beam 16 to repeat the beam deflection operation of AOD 32 to drill an adjacent line of vias 18 at via locations 36 in scan field region 50. The positioning of LOA 52 and drilling a line of vias 18 is repeated until completion of the drilling of all lines of vias 18 encompassed by scan field region 50. Movable stage 34 slews scan field region 50 over process surface 38 to cover undrilled via locations 36 and enable drilling of them by processing laser 16 in response to beam deflection by AOD 32. Movable stage 34 reverses direction by executing a turnaround maneuver indicated by curved arrow 66 at the lower boundary of array 62 to continue movement of scan field region 50 over undrilled via locations 36 for processing laser 16 in response to beam deflection by AOD 32.

Scan field region 50 can be sized to allow processing by the beam deflection operation of AOD 32 to continue without interruption by moving LOA 52 of AOD 32 within scan field region 50 during turnaround maneuver 66 of movable stage 34. Skilled persons will appreciate that increasing the number of via locations 36 scanned and thereby processed by processing laser 16 in response to beam deflection by AOD 32 along LOA 52 decreases the required velocity and acceleration of movable stage 34. Skilled persons will appreciate that this embodiment of beam positioning system 10 implemented with one AOD 32 can function properly if via locations are irregularly spaced apart but aligned along LOA 52. The operation of AOD 32 can account for irregular spacing between adjacent via locations 36.

In an alternative implementation, controller 60 can coordinate the movements of movable stage 34 and galvanometer head 30 to maintain LOA 52 at a constant location on process surface 38, even as movable stage 34 is in motion. Such operation is accomplished by compound beam positioner systems described in U.S. Pat. Nos. 5,798,927 and 5,751,585, which are assigned to the assignee of this patent application.

The operation of AOD 32 rapidly positions (with a response time of between 0.1 μsec and 10 μsec) processing beam 16 to a next adjacent via location 36 and thereby effectively eliminates move time between via locations 36 and along LOA 52, while allowing processing laser beam 16 to dwell at each via location 36 for processing. This move-and-dwell capability relaxes a requirement that galvanometer head 30 rapidly and repeatedly position (with a response time of between 0.1 msec and 1.0 msec) scan field region 50 without stopping at each via location 36. Instead, at each via location 36 along LOA 52, several vias 18 are completely processed over a few milliseconds, and after which galvanometer head 30 positions LOA 52 at the next available line of vias locations 36, and the process is repeated. If N number of vias 18 are processed in each LOA 52, the line-to-line move time of galvanometer head 30 happens only every N number of vias 18, thereby diluting the effect of the frequency of acceleration and deceleration of galvanometer head 30 on overall throughput. The number, N, of vias 18 scanned along LOA 52 by AOD 32 sets its AOD scan field.

In the case of a single AOD architecture, the attainable throughput depends on drill time for each via 18 and the move time of galvanometer head 30. The drill time depends on the available laser power and repetition rate of the laser emitting input beam 14, and the overall move time is a function of the number, N, of vias 18 for each LOA 52 and the move time of galvanometer head 30. For a drill time, $T_d$, and galvanometer head 30 move time, $T_g$, between LOA 52 positions, the overall throughput in vias per second, VPS, is given by $$VPS = N/(N \times T_d + T_g).$$

Figure 3:
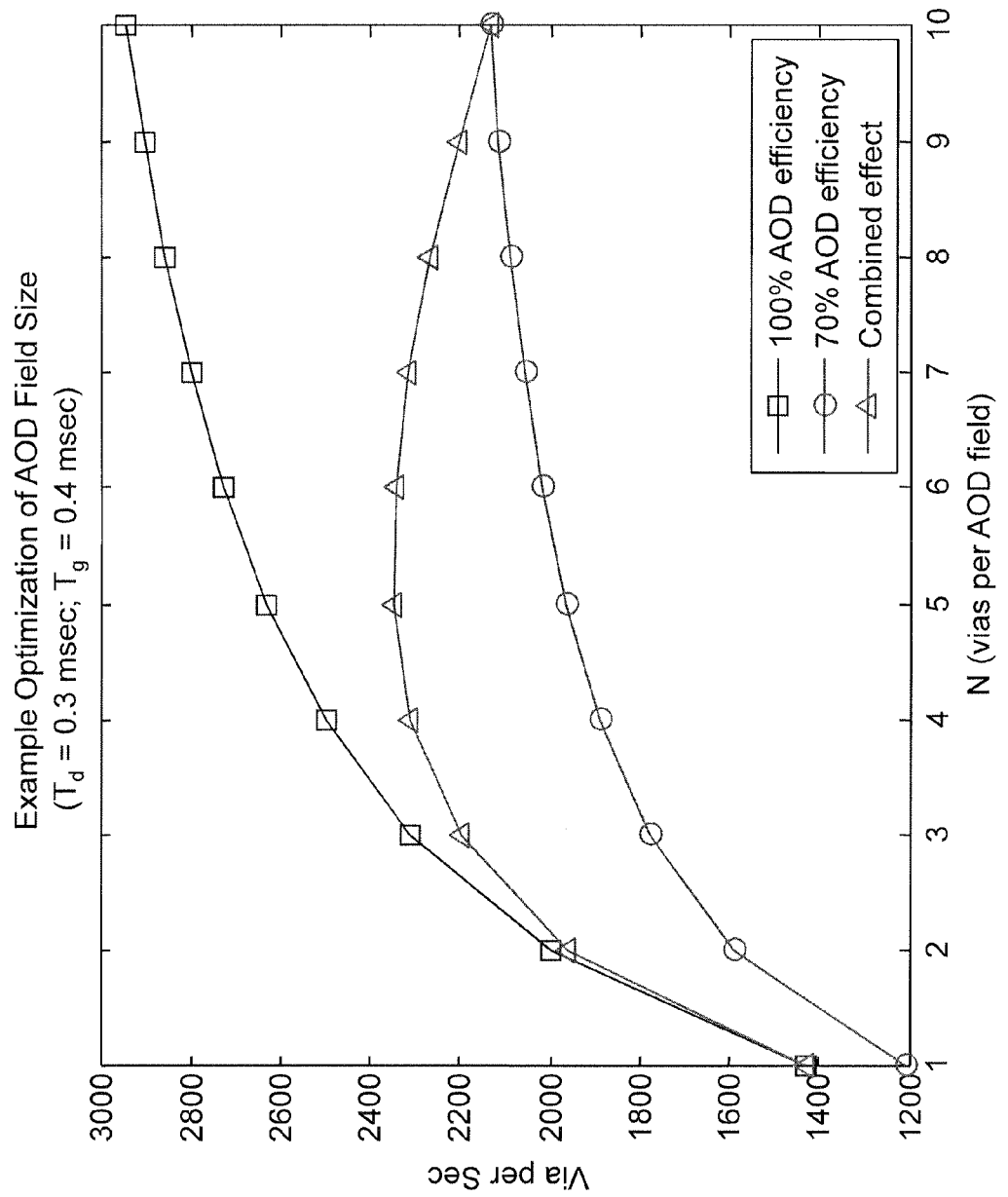
FIG. 3 is a graph of a set of curves presenting an example of optimizing the size of the scan field of the acousto-optic deflector of the beam positioning system of FIG. 1.

The influences of $T_d$ and $T_g$ are conflicting and are, therefore, balanced in the system design. The N number of vias 18 can be increased with a larger AOD scan field, but as the AOD scan field increases, the minimum transmission efficiency of AOD 32 decreases, thereby decreasing laser power and resulting in longer drill times. FIG. 3 presents an example of optimization of the size of an AOD scan field by illustrating the effect of trading off $T_d$ and $T_g$. A simplified assumption underlying the example is that the efficiency of AOD 32 varies linearly from 100% to 70% for 1 via 18 and 10 vias 18 in the AOD scan field. In this simple example, the optimum AOD scan field size is 4-6 vias 18. Skilled persons will appreciate that, in practice, AOD efficiency is not a simple linear function of scan field size. An accurate determination of the optimum scan field size entails provision of an accurate model of AOD efficiency vs. beam deflection, but such a model is derivable from a readily performed calculation for a given AOD efficiency curve.

In typical designs of AOD 32, the laser power decreases most significantly at the extremes of beam deflection of AOD 32. Thus, it is possible to vary one or both of the number of processing pulses and power of processing beam 16 as a function of AOD scan field location. In this way, drill time, although not constant over the entire AOD scan field, is more fully optimized.

An additional extension is possible by allowing galvanometer head 30 to slew LOA 52 along X-axis direction 40 during processing of LOA 52, thereby effectively extending the length of LOA 52 and further diluting the effect of galvanometer head 30 move time contributing to overall time consumed to cover process surface 38 of workpiece 20. This would entail controller 60 implementing an additional level of coordination between galvanometer head 30 and AOD 32. A consequence of this extension would be introduction of additional acceleration and deceleration of galvanometer head 30 at each sequence of LOA 52 and thereby increased thermal load on galvanometer head 30 and risk of accuracy degradation. This extension would, however, allow the overall via processing time to approach the raw drill time of via 18.

Use of a single AOD 32 affords a moderately complex system architecture of beam positioning system 10. Use of a two-dimensional AOD scanning architecture is practicable but typically entails an increase in cost and complexity relative to the cost and complexity of a one-dimensional AOD scanning architecture. (A two-dimensional AOD scanning architecture is one in which zero-inertia optical deflector 32 is composed of two AODs configured to direct processing beam 16 along the X- and Y-axes. FIG. 1 shows in phantom lines an AOD 32' as a second zero-inertia optical deflector for use in beam positioning system 10.) This is so because, when two AOD devices are used, additional optical components are provided for proper beam conditioning. However, a single-AOD 32 system architecture performs satisfactorily when workpiece features 18 are aligned fairly consistently (at least within a fraction of the required feature placement accuracy). If workpiece features 18 are nominally aligned but rotated relative to the deflection axis (i.e., X-axis) of AOD 32, one or both of workpiece and optical rotation may be employed to align AOD 32 with features 18. For example, a rotating "theta" stage 70 (FIG. 1) may rotate workpiece 20, or the deflection axis of AOD 32 along LOA 52 may be rotated with use of a Dove prism. Of course, if beam positioning system 10 can align workpiece 20 with sufficient angular accuracy, a rotating stage or Dove prism would not be used.

Figure 4:
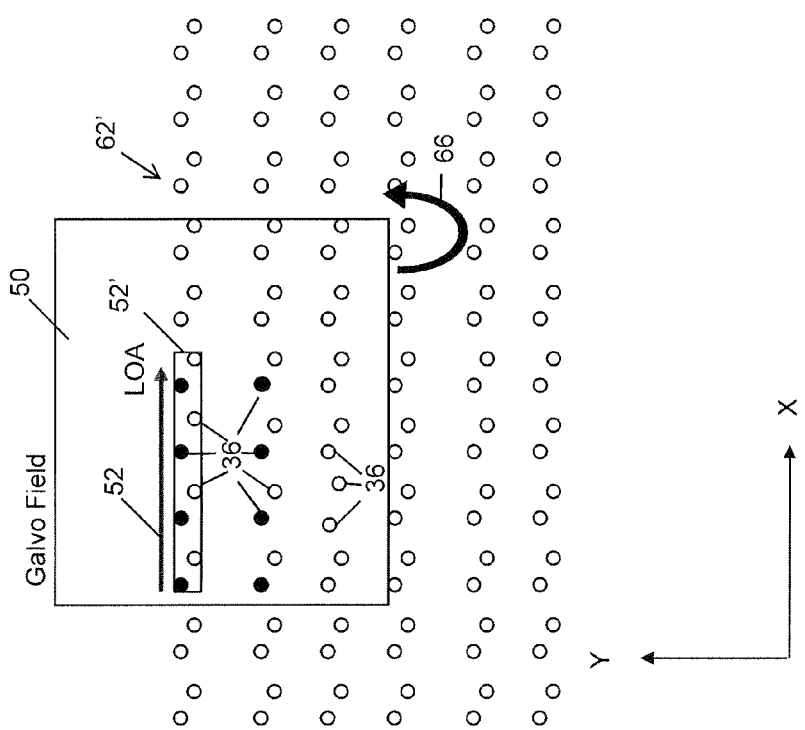
FIG. 4 is a diagram showing a plan view of an array of feature locations unaligned in the direction of movement of the processing laser line of action shown in FIG. 2.

Practical applications for use of a two-dimensional AOD scanning architecture include processing irregularly spaced workpiece features, processing under conditions in which the width of the processing band is sufficiently small (i.e., a feature location is offset from a straight line of action by about the width of a feature), and processing AOD scan fields of moderate numbers (i.e., five to ten) of workpiece features. FIG. 4 illustrates the second situation, in which densely spaced feature locations 36 in an array 62' are not aligned in the direction of LOA 52, but describe a processing band 52' having a width equal to about twice the diameter of a feature location 36. An increase in complexity and diminution in optical efficiency can be justified in processing irregularly spaced workpiece features that do not lie along a linear processing band (i.e., an LOA), and a diminution in optical efficiency is the significant downside in processing moderate numbers of workpiece features.

It may be possible in some applications to use a simple two-dimensional AOD scanning architecture, in which case even the LOA move time can be effectively eliminated. Moreover, a two-dimensional AOD scanning architecture may relax the application of the above-described approach to regularly spaced workpiece features 18, since the second AOD deflection axis could be used to adjust the cross-axis axis position between features 18. Skilled persons will appreciate that, during its dwell time, processing beam 16 in response to deflection by a two-dimensional AOD could either trepan or spiral process workpiece 20 to form a via 18 at via location 36.

Advantages of beam positioning system 10 include the following. Beam positioning system 10 provides extremely high-throughput processing of regularly spaced workpiece features 18, while minimizing the degradation of accuracy and workpiece feature quality that result from dynamic and thermal loads on the beam positioning and optical components. Beam positioning system 10 can lower the system cost for such applications by eliminating the high cost of large scan lenses. Modulating the RF power applied to AOD 32 used for beam positioning can also provide laser power control, thereby eliminating additional system components.

It will be obvious to those having skill in the art that many changes may be made to the details of the above-described embodiments without departing from the underlying principles of the invention. A zero-inertia optical deflector of an electro-optic deflector (EOD) type may be substituted for an AOD, but because the displacement range of an EOD is more limited than that of an AOD, an EOD could achieve about 3-5 laser spot diameter deflection range. The scope of the present invention should, therefore, be determined only by the following claims.

The invention claimed is:

1. A method of accomplishing high-throughput laser processing of workpiece features arranged in a densely spaced pattern while minimizing workpiece feature processing inaccuracy and quality degradation that result from dynamic and thermal loads on laser beam positioning and optical components directing the laser beam during workpiece feature processing, comprising:

positioning a workpiece on a support, the workpiece having a process surface that defines a process surface area;

directing a laser beam to a beam positioning system to provide a processing laser beam for incidence at feature locations on the process surface of the workpiece, the beam positioning system including a movable stage and first and second beam positioners that cooperate with the movable stage to process in a densely spaced pattern workpiece features at the feature locations on the process surface of the workpiece, the first beam positioner including an optical beam deflector surface mechanism that has a light beam-receiving surface with a center location and is characterized by a first response time, the optical beam deflection surface mechanism operable to position the processing laser beam within a scan field region of the process surface, and the second beam positioner including a zero-inertia optical deflector that receives and deflects the laser beam to produce a deflected output beam propagating to impinge on the light beam-receiving surface, is characterized by a second response time, and is operable to move the processing beam to locations within the scan field region, the second response time being shorter than the first response time;

causing the deflected output beam to impinge on the light beam-receiving surface substantially at the center location to control distortion of the scan field region of the process surface of the workpiece; and controlling the beam positioning system to coordinate operation of the movable stage and the first beam positioner to position the processing laser beam within the scan field region and move the scan field region to cover the process surface, the scan field region being substantially smaller than the process surface area of the workpiece and including multiple processing bands that each encompass multiple feature locations; to operate the optical beam deflection surface mechanism of the first beam positioner to successively position the processing laser beam to the multiple processing bands within the scan field region; and to operate the second beam positioner to process the workpiece features at the multiple feature locations in each of the processing bands by moving the processing laser beam to and dwelling the processing laser beam at each feature location to process the workpiece features in the processing band, so that the first beam positioner undergoes negligible acceleration and deceleration during workpiece feature processing within the scan field region.

2. The method of claim 1, in which the workpiece is a silicon wafer patterned with an array of solar cells.

3. The method of claim 1, in which the first beam positioner includes a mirror-based beam positioner.

4. The method of claim 3, in which the mirror-based beam positioner includes a two-axis galvanometer beam positioner head.

5. The method of claim 3, in which the mirror-based beam positioner includes a two-axis fast steering mirror.

6. The method of claim 1, in which the movable stage supports the first beam positioner and the zero-inertia optical deflector.

7. The method of claim 1, in which the movable stage includes first and second linear stage components that move in orthogonal directions, the first linear stage component supporting the first beam positioner and the zero-inertia optical deflector, and the second linear stage component including the support on which the workpiece is positioned.

8. The method of claim 1, in which the zero-inertia optical deflector includes an acousto-optic deflector that operates to describe a line of action as the processing band.

9. The method of claim 1, in which the zero-inertia optical deflector includes an electro-optical deflector that operates to describe a line of action as the processing band.

10. The method of claim 1, in which the zero-inertia optical deflector is a component of a one-dimensional scanning architecture and includes an acousto-optic deflector or an electro-optic deflector that operates to describe a line of action as the processing band, and in which the processing laser beam dwells at each feature location to process the workpiece features in the line of action by punching with a number of laser pulses.

11. The method of claim 1, in which positioning of a relay lens along an optical path between the first and second beam positioners causes the deflected output beam to impinge on the light beam-receiving surface substantially at the center location to control distortion of the scan field region.

12. The method of claim 1, in which the processing band has a length, and further comprising controlling the beam positioning system to operate the first beam positioner to slew and thereby extend the processing band as the second beam positioner moves and dwells the processing laser beam to process the workpiece features in the processing band, thereby to reduce time of movement of the first beam positioner as it moves the scan field region as a contribution to an overall time that is consumed to cover the process surface of the workpiece.

13. The method of claim 1, in which the zero-inertia optical deflector is a component of a two-dimensional scanning architecture and includes two acousto-optic deflectors or two electro-optic deflectors, and in which the processing laser beam dwells at each feature location to process the workpiece features in the processing band by punching with a number of laser pulses.

14. The method of claim 1, in which the zero-inertia optical deflector is a component of a two-dimensional scanning architecture and includes two acousto-optic deflectors or two electro-optical deflectors, and in which the processing beam dwells at each feature location to process the workpiece features in the processing band by trepan processing of the workpiece features.

15. The method of claim 1, in which the zero-inertia optical deflector is a component of a two-dimensional scanning architecture and includes two acousto-optic deflectors or two electro-optical deflectors, and in which the processing beam dwells at each feature location to process the workpiece features in the processing band by spiral processing of the workpiece features.

16. The method of claim 1, in which the processing laser beam includes a number of laser pulses to process one of the workpiece features, and further comprising determining the number of laser pulses as a function of the feature location of the feature undergoing processing along the processing band in the scan field region, thereby to further optimize time that is consumed by the processing laser beam processing workpiece features within the scan field region.

17. The method of claim 1, in which the processing laser beam is characterized by a laser power to process one of the workpiece features, and further comprising determining the laser power as a function of the feature location of the feature undergoing processing along the processing band in the scan field region, thereby to further optimize time that is consumed by the processing laser beam processing workpiece features within the scan field region.

* * * * *